(12) United States Patent
Lai et al.

(10) Patent No.: US 8,704,590 B2
(45) Date of Patent: Apr. 22, 2014

(54) CONTROL CIRCUIT FOR POWER CONVERTER AND METHOD THEREOF

(71) Applicant: Richtek Technology Corporation, Hsinchu County (TW)

(72) Inventors: Yung-Chih Lai, Miaoli (TW); Isaac Y Chen, Zhubei (TW); Chien-Fu Tang, Hsinchu (TW); Jiun-Hung Pan, Taipei (TW)

(73) Assignee: Richtek Technology Corporation, Zhubei, Hsinchu County (TW)

( * ) Notice: Subject to any disclaimer, the term of this patent is extended or adjusted under 35 U.S.C. 154(b) by 0 days.

(21) Appl. No.: 14/032,959

(22) Filed: Sep. 20, 2013

(65) Prior Publication Data

US 2014/0022010 A1    Jan. 23, 2014

Related U.S. Application Data

(62) Division of application No. 13/796,547, filed on Mar. 12, 2013.

(30) Foreign Application Priority Data

Mar. 12, 2012    (TW) .............................. 101108372 A

(51) Int. Cl.
    *G05F 1/10*    (2006.01)
(52) U.S. Cl.
    USPC ............ 327/540; 327/538; 323/284; 323/311
(58) Field of Classification Search
    USPC ......... 327/574, 531, 538, 540, 541, 543, 544,
        327/545, 546, 560, 561, 562, 563, 564, 565,
        327/583, 587, 588, 590, 427, 434, 448,
        327/494; 363/74, 78, 81, 82, 84, 126;
        323/247, 265, 277, 280, 282, 283, 284,
        323/290, 311, 312, 349, 352, 353, 365
    See application file for complete search history.

(56) References Cited

U.S. PATENT DOCUMENTS

| | | | |
|---|---|---|---|
| 7,098,632 B2 * | 8/2006 | Chen et al. ..................... | 323/222 |
| 7,315,190 B1 | 1/2008 | Chen | |
| 7,457,138 B2 | 11/2008 | Sheng et al. | |
| 7,471,072 B2 | 12/2008 | Fogg et al. | |
| 8,022,672 B2 * | 9/2011 | Pai et al. ........................ | 320/128 |

* cited by examiner

*Primary Examiner* — Lincoln Donovan
*Assistant Examiner* — Jung H Kim
(74) *Attorney, Agent, or Firm* — Birch, Stewart, Kolasch & Birch, LLP

(57) ABSTRACT

A control circuit for a power converter includes a shared pin, a driving circuit, a current source, a sampling circuit, and a signal processing circuit. The shared pin is coupled with an output end of the power converter through a resistor. The driving circuit conducts a switch of the power converter. The current source provides a current to the resistor through the shared pin. The sampling circuit samples the signal on the shared pin for generating a first sampling value and a second sampling value. The signal processing circuit calculates a first difference between the first sampling value and a first reference value, and a second difference between the second sampling value and a second reference value. When the difference between the first difference and the second difference is less than a predetermined value, the signal processing circuit may therefore configure the conduction time or frequency of the switch.

9 Claims, 6 Drawing Sheets

CONTROL CIRCUIT FOR POWER CONVERTER AND METHOD THEREOF

CROSS-REFERENCE TO RELATED APPLICATIONS

This application is a Divisional of co-pending U.S. patent application Ser. No. 13/796,547 filed on Mar. 12, 2013, which claims the benefit of priority to Taiwanese Patent Application No. 101108372, filed on Mar. 12, 2012; the entirety of which is incorporated herein by reference for all purposes.

BACKGROUND

The present disclosure generally relates to a control circuit for a power converter and, more particularly, to the control circuit with a reduced number of package pins.

With the progress of the technology, electronic elements may be downsized to fit in the limited space of the electronic devices. For example, the integrated circuit (IC) element comprising a die encapsulated by a package is frequently utilized in the electronic devices. The IC element is usually coupled with other circuit elements through the package pins, and therefore a large-size package is usually needed for accommodating the required number of the package pins. In this situation, the die size is usually much smaller than the size of the package. Not only the wasted package materials result in environmental issues, but also the dimension of the IC element may not be reduced effectively.

In the field of power converters, e.g., AC to DC (AC-DC) power converters and DC to DC (DC-DC) power converters, when the control circuit of the power converter is realized with an IC element, the die size of the control circuit is usually small compared with the size of the package. The control circuit, however, needs many pins to be coupled with other circuit elements, to configure the power stage circuit of the power converter, to receive feedback signals, to receive operation parameters, etc. The package encapsulating the die of the control circuit must have enough pins, which are usually accompanied with the increase in the package size. The design flexibility is therefore constrained.

Some try to reduce the required pin number and the package size of the IC elements by utilizing one or more shared pins. Because the characteristics of IC elements are different, there are no clear rules which may be applicable universally. The circuit blocks of the IC element with a shared pin must be carefully designed to ensure the correct functionality of the IC element.

SUMMARY

In view of the foregoing, it may be appreciated that a substantial need exists for methods and apparatuses that mitigate or reduce the problems above.

An example embodiment of a control circuit of a power converter, comprising: a shared pin, for coupling with an output end of a power converter; a driving circuit, for coupling with a switch of the power converter to configure a conduction status of the switch; a current source circuit, coupled with the shared pin, for providing a current to the resistor through the shared pin in a first period; a sampling circuit, coupled with the shared pin, for sampling a signal on the shared pin in a first interval and a second interval of the first period to respectively generate a first sampling value and a second sampling value; and a signal processing circuit, coupled with the shared pin of the sampling circuit, for comparing the first sampling value with a first reference value, comparing the second sampling value with a second reference value, calculating a first difference between the first sampling value and the first reference value, and calculating a second difference between the second sampling value and a second reference value; wherein when a difference between the first difference and the second difference is less than a predetermined value, the signal processing circuit receives an output signal on the output end through the shared pin, and configures at least one of a conduction time and a conduction frequency of the switch through the driving circuit according to at least one of the output signal and a computation value calculated according to the output signal.

Another example embodiment of a control method for a power converter, comprising: coupling a shared pin with an output end of a power converter through a resistor; providing a current to the resistor through the shared pin in a first period; sampling a signal on the shared pin in a first interval and a second interval of the first period to respectively generate a first sampling value and a second sampling value; comparing the first sampling value with a first reference value and calculating a first difference between the first sampling value and the first reference value; comparing the second sampling value with a second reference value and calculating a second difference between the second sampling value and the second reference value; and when a third difference between the first difference and the second difference is less than a predetermined value, receiving an output signal on the output end of the power converter through the shared pin in a second period, and accordingly configuring at least one of a conduction time and a conduction frequency of a switch of the power converter according to at least one of the output signal and a computation value calculated according to the output signal.

It is to be understood that both the foregoing general description and the following detailed description are example and explanatory only and are not restrictive of the invention, as claimed.

All of the drawings are arranged in accordance with at least some embodiments described herein.

DETAILED DESCRIPTION

Reference is made in detail to embodiments of the invention, which are illustrated in the accompanying drawings.

Power converters are used as examples below to illustrate the present invention. In the embodiments below, the control circuit of the power converter may utilize a specific pin to obtain operation parameters and feedback signals for effectively minimizing the pin number of the package and the package size.

Figure 1:
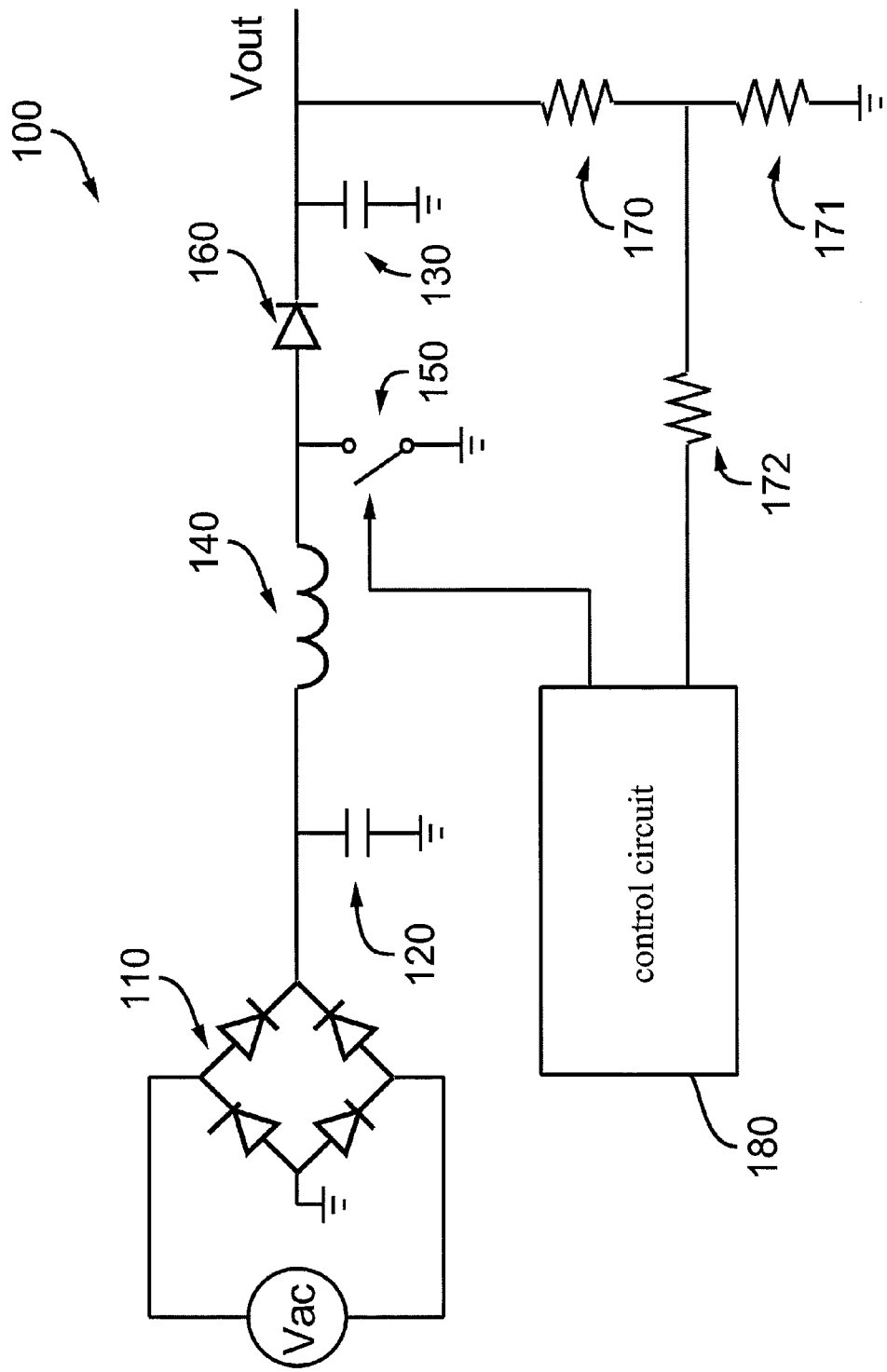
FIG. 1 shows a simplified functional block diagram of an example AC-DC converter.

FIG. 1 shows a simplified functional block diagram of an example AD-DC power converter 100. The power converter 100 comprises a bridge rectifier 110, capacitors 120 and 130, an inductor 140, a switch 150, a diode 160, a resistor 170, and a control circuit 180. Some components and connections are simplified or omitted in FIG. 1 for the purposes of conciseness and clear explanation.

In this embodiment, the bridge rectifier 110 comprises four diodes for rectifying the AC signals of the AC current source Vac to generate corresponding DC output signals. In other embodiments, the bridge rectifier 110 may also be realized with other suitable structures.

The switch 150 may be realized with the FET, the BJT, other types of transistors, or other types of switches. The control circuit 180 is coupled with the control terminal of the transistor (e.g., the gate of the FET or the base of the BJT) for conducting the switch 150 at appropriate time so that the AC signals of the AC power source Vac may be converted to the required DC output signals Vout. In this embodiment, the switch 150 is realized with a transistor for the purpose of clear explanation. In other embodiments, the switch 150 also may be realized with other types of transistors or other types of switches. For example, the switch 150 may also be realized with one or more transistors in combination with other circuit elements.

The control circuit 180 may configure the conduction status of the switch 150. Moreover, the control circuit 180 receives the DC output signals Vout of the power converter 100 through a feedback path of the resistors 170, 171, and 172 so as to configure the operation of the power converter 100. For example, the control circuit 180 configures at least one of the conduction time and the conduction frequency of the switch 150 according to feedback signals of the DC output signals Vout received from the feedback path of the resistors 170, 171, and 172. Besides, the control circuit 180 may be used for configuring the power factor of the power converter 100 or other operations of the power converter 100.

In this embodiment, the control circuit 180 may configure one or more operating parameters of the power converter 100 or configure the operation of other components according to the resistances of the resistors 170, 171, and 172. For example, the control circuit 180 may configure the overcurrent protection value according to the resistances of the resistors 170, 171, and 172. When the current flowing through the power converter 100 is greater than the overcurrent protection value, the control circuit 180 ceases the operation of one or more components or takes suitable measures to prevent from the damage of the power converter 100. In other embodiments, the resistors 170, 171, and 172 may be realized with other circuit elements, and the control circuit 180 configures the operation of the power converter 100 or the operations of other components accordingly.

Figure 2:
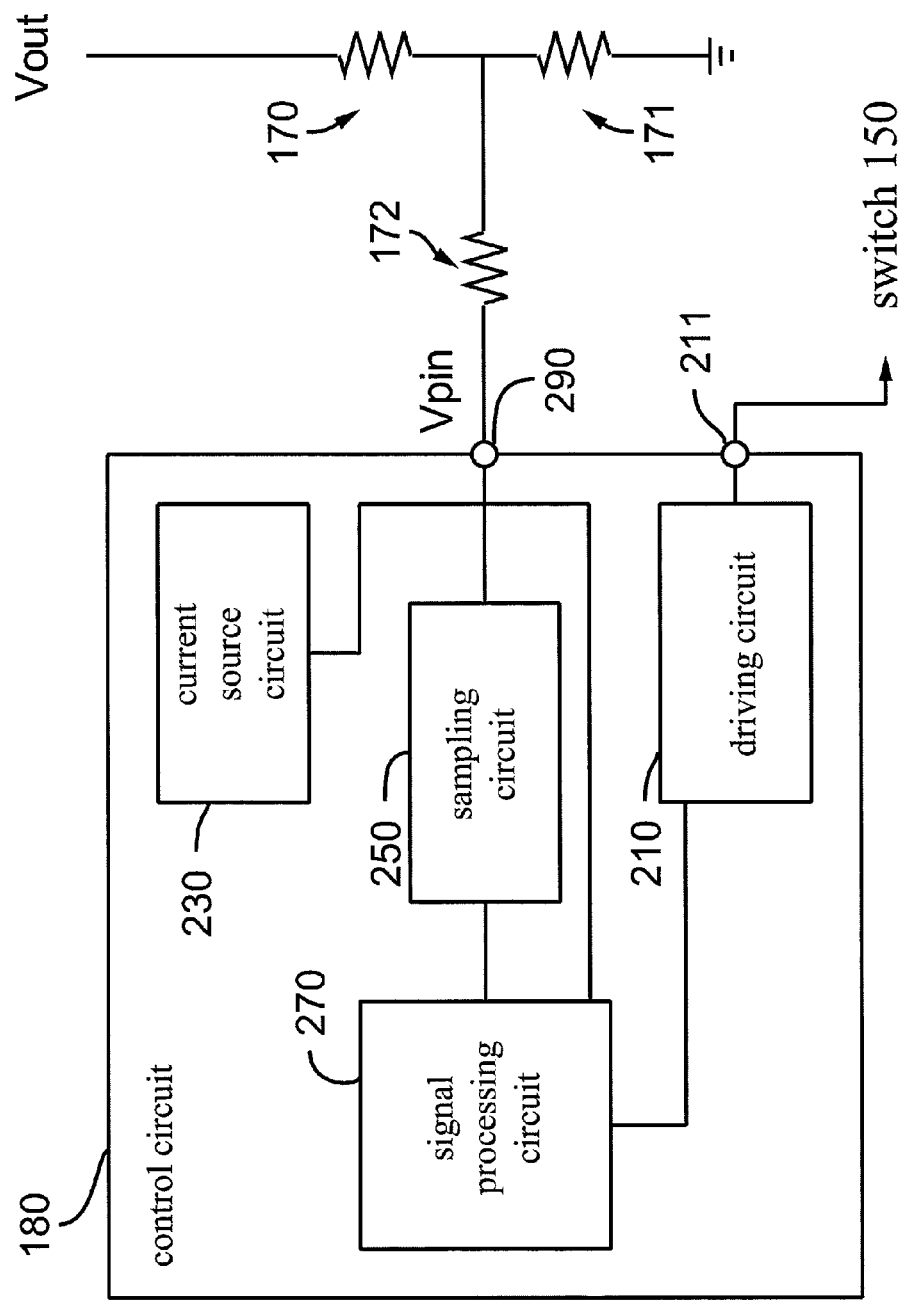
FIG. 2 shows a simplified functional block diagram of an example control circuit in FIG. 1.

FIG. 2 shows a simplified functional block diagram of an example control circuit 180 in FIG. 1. The control circuit 180 comprises a driving circuit 210, a pin 211, a current source circuit 230, a sampling circuit 250, a signal processing circuit 270, and a shared pin 290. In this embodiment, the shared pin 290 is coupled with the resistor 172.

The driving circuit 210 is coupled with the control terminal of the switch 150 through the pin 211 to generate driving signals for configuring the conduction status of the switch 150. Thus, the power converter 100 may generate the required DC output signals Vout. In this embodiment, the driving circuit 210 generates pulse width modulation signals to intermittently conduct the switch 150. In other embodiments, the driving circuit 210 may be realized with a tristate driving circuit so that the signal processing circuit 270 may configure the driving circuit 210 to be in the operation state for configuring the conduction status of the switch 150 or to be to be in the high impedance state. In this embodiment, the driving circuit 210 may configure the duty cycle and/or the frequency of the pulse width modulation signals to adjust at least one of the conduction time and the conduction frequency of the switch 150. Therefore, the power converter 100 may generate the required output voltage and/or the required output current.

The current source circuit 230 may be realized with any suitable circuit structures to provide the required current. For example, the current source circuit 230 may be realized with a current mirror circuit. The current source circuit 230 is coupled with the resistor 172 through the shared pin 290 to provide the current to the resistor 172 for generating a voltage corresponding to the resistance of the resistor 172. In this embodiment, the equivalent resistance Req of the resistors 170, 171, and 172 equals to R172+[R170*R171/(R170+R171)], wherein R170, R171, and R172 are respectively the resistances of the resistors 170, 171, and 172. Therefore, the current source circuit 230 may generate a voltage on the shared pin 290 corresponding to the equivalent resistance Req and therefore corresponding to the resistance of the resistor 172.

The sampling circuit 250 is coupled with the shared pin 290 to sample the voltage on the shared pin 290. The sampling values are transmitted to the signal processing circuit 270 for further processing. The sampling circuit 250 may be realized with the analog-to-digital converter or other suitable circuit structures.

The signal processing circuit 270 receives the sampling values transmitted from the sampling circuit 250, and configures the operation parameter(s) of the power converter 100 according to the sampling values or computation values calculated according to the sampling values. For example, the signal processing circuit 270 may configure the operation parameters of the power converter 100 or the operation parameters of the components in the power converter 100. In this embodiment, the signal processing circuit 270 receives a plurality of sampling values transmitted from the sampling circuit 250 and compares these received sampling values to minimize the influence of the noise when the sampling circuit 250 samples signals on the shared pin 290. When the difference(s) between two or more consecutive sampling values are less than a predetermined value (e.g., two or more consecutive sampling values are equal), the signal processing circuit 270 configures the operation parameter for the power converter 100 according to the sampling values. The signal processing circuit 270 may be realized with processors, micro controllers, digital circuits, and/or analog circuits in combination with memory units so as to store and compare a plurality of sampling values. For example, in one embodiment, the sampling values may be stored in one or more registers and compared with a comparator circuit.

Moreover, the signal processing circuit 270 is coupled with the shared pin 290 to receive feedback signals of the DC output signals Vout through the feedback path of the resistors 170, 171, and the 172 for configuring the operation of the power converter 100. For example, the signal processing circuit 270 may configure the driving circuit 210 to generate the required pulse width modulation signals according to the DC output signals Vout and/or the computation value(s) calculated according to the DC output signals Vout. Thus, the conduction time and/or the conduction frequency of the switch 150 may be configured to generate the required output voltage and/or the output current.

Figure 3:
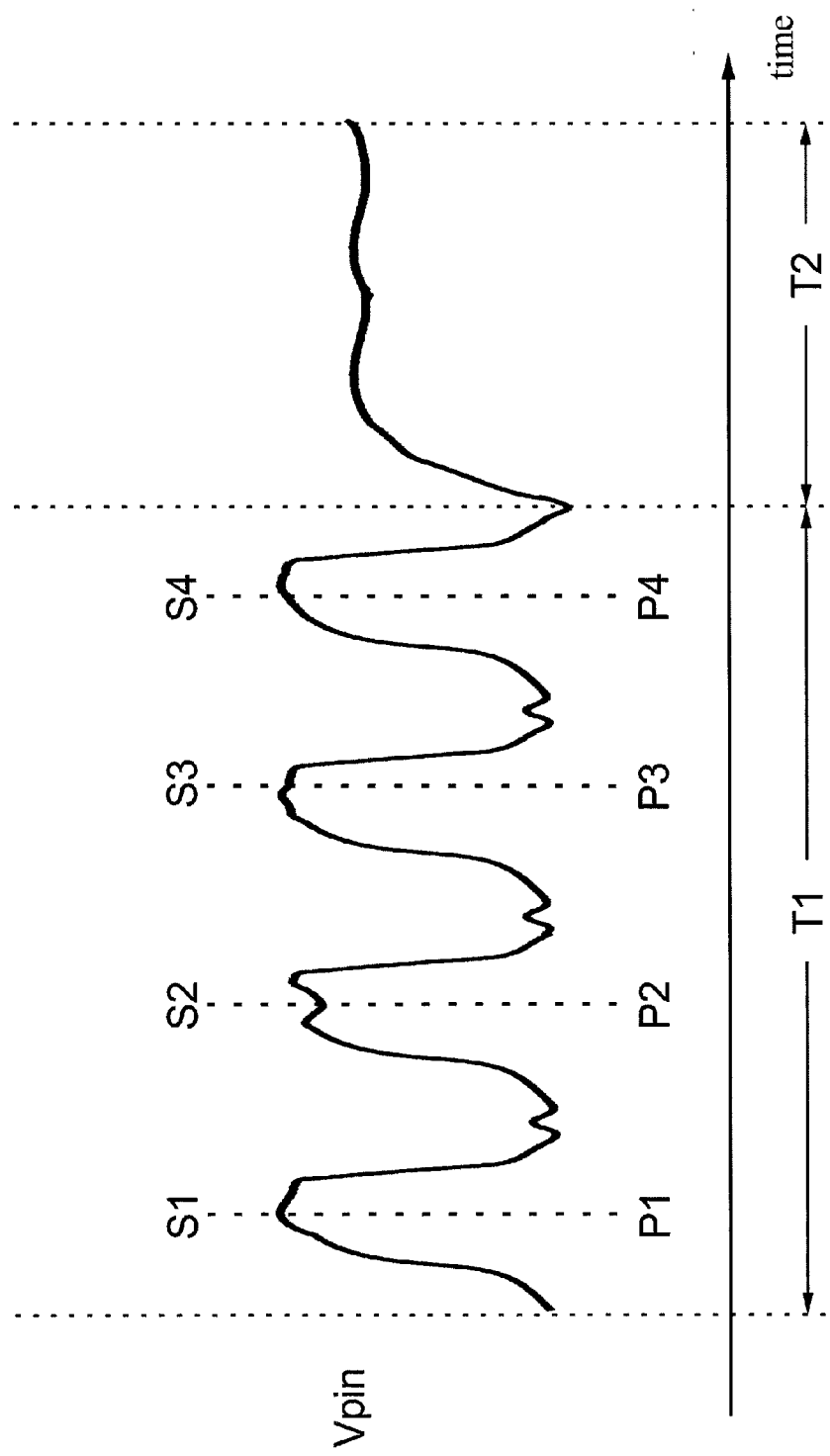
FIG. 3 shows a simplified timing diagram of several example signals generated by the AC-DC power converter in FIG. 1.

FIG. 3 shows a simplified timing diagram of example signals generated by the power converter 100 in FIG. 1. The operations of converter 100 and the control circuit 180 are further explained below with FIG. 1-3.

In the period T1 in FIG. 3, the AC power source Vac starts to provide power and the current source circuit 230 provides a current to the resistor 172 through the shared pin 290 for generating a voltage on the shared pin 290. In this embodiment, the current source circuit 230 repetitively varies the provided current. For example, the current source circuit 230 provides a first predetermined current in a first interval and provides a second predetermined current (or does not provide current) in a second interval.

In the period T1, the power converter 100 has not operated normally so that the signals in the power converter 100 are not stable. In this embodiment, the sampling circuit 250 samples the voltage Vpin on the shared pin when the current source circuit 230 provides a greater current. Accordingly, the sampling circuit 250 samples the voltage Vpin on the shared pin 290 in the intervals P1~P4 and obtain the sampling values S1~S4. Because the differences between the signals S1~S3 are not less than a predetermined value, the signal processing circuit 270 does not configure the operation parameters of the power converter 100 according to the sampling values S1~S3. When the difference between the sampling values S3 and S4 is less than the predetermined value (e.g., the sampling value S3 and S4 are equal), the signal processing circuit 270 configures the operation parameters of the power converter 100 according to the sampling value S3, the sampling value S4, and/or the computation value(s) calculated according to at least one of the sampling value S3 and the sampling value S4.

After the control circuit 180 configures the operation parameters of the power converter 100, the power converter operates normally for conducting the switch 150 at appropriate time in the period T2. Thus, the power converter 100 may generate the required DC signal Vout. Moreover, the signal processing circuit 270 also receives the DC output signal Vout of the power converter 100 through the feedback path of the resistors 170, 171, and 172 for configuring the driving circuit 210 to adjust at least one of the conduction time and the conduction frequency of the switch 150. Therefore, the power converter 100 may generate the required output voltage and/or the required output current.

In the above embodiments, the power converter 100 has not operated normally in the period T1. The driving circuit 210 may be configured to not provide the driving signals and/or the signal processing circuit 270 may configure the driving circuit 210 to be in the high impedance state. The driving signals are not transmitted to the pin 211 and the switch 150 will not be conducted abnormally. Therefore, the sampling circuit 250 may sample the voltage Vpin on the shared pin 290 without the abnormal conduction of the switch 150. In other embodiments, the driving circuit 210 may generate the pulse width modulation signals and transmit the pulse width modulation signals to the control terminal of the switch 150 in the period T2 for intermittently conducting the switch 150.

Figure 4:
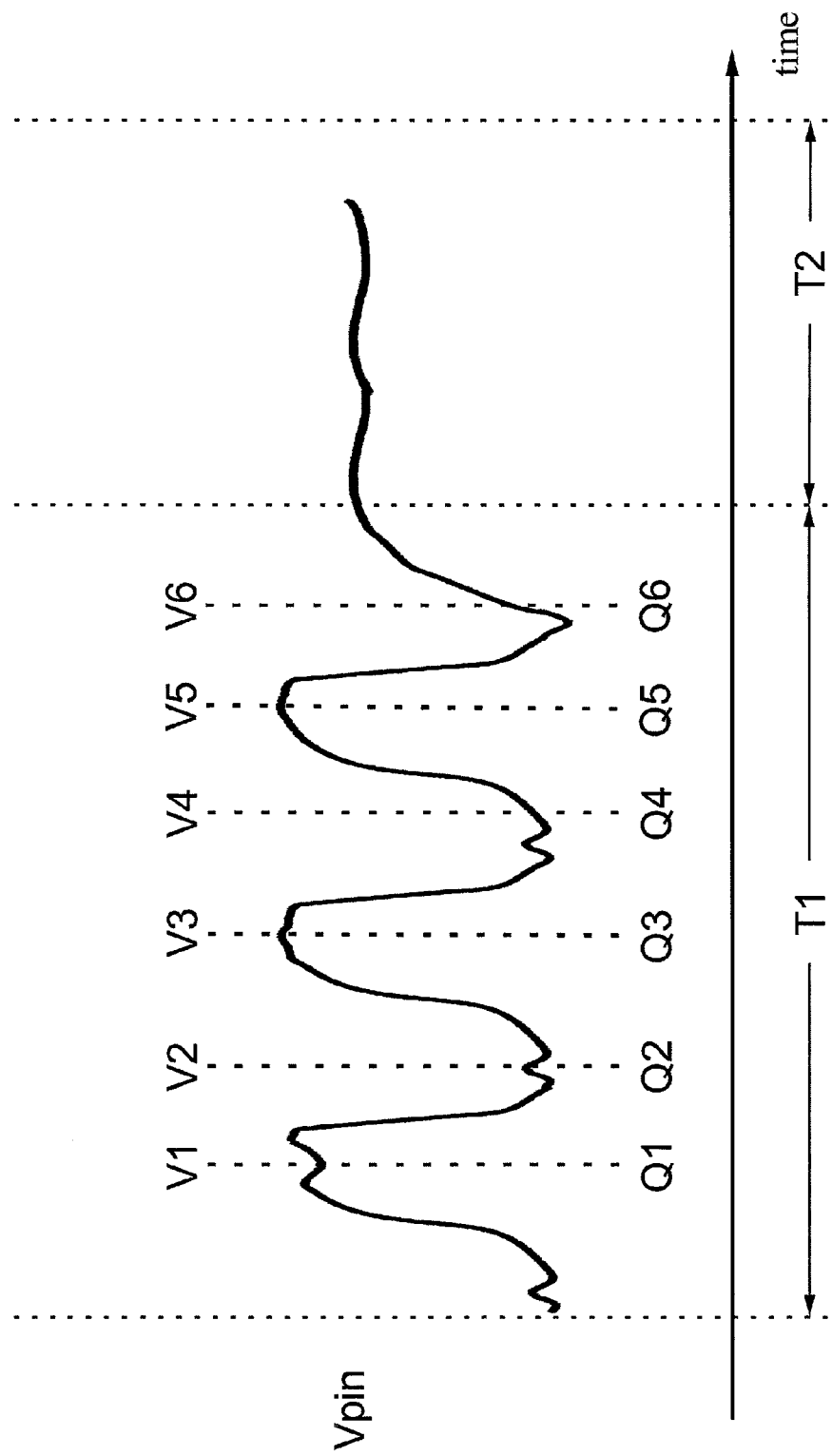
FIG. 4 shows another simplified timing diagram of several example signals generated by the AC-DC power converter in FIG. 1.

FIG. 4 shows another simplified timing diagram of example signals generated by the AC-DC power converter 100 in FIG. 1. The operation of the power converter 100 and the control circuit 180 are further explained below with FIGS. 1, 2, and 4. In this embodiment, the current source circuit 230 may generate two or more current values, and the sampling circuit 250 respectively samples the voltages Vpin on the shared pin 290 when the current source circuit 230 provides different current values. The signal processing circuit 270 compares the differences between the voltages Vpin sampled when the current source circuit 230 provides different current values. When two or more differences between the sampling values are less than a predetermined value (e.g., two or more differences between the sampling values are equal), the signal processing circuit 270 configures the operation parameters according to at least one of the sampling value(s), the difference(s) of the sampling value(s), and the computation value (s) calculated according to the sampling value(s) and/or the difference(s).

In the period T1 in the FIG. 4, the AC power source starts to provide power and the current source circuit 230 provides different current values to the resistor 172 through the shared pin 290 to generate the voltage Vpin on the shared pin 290. In this embodiment, the current source circuit 230 varies the provided current repetitively. For example, the current source circuit 230 provides a first predetermined current value in the intervals Q1, Q3, and Q5 and provides a second predetermined current value (or does not provide current) in the intervals Q2, Q4, and Q6.

In this embodiment, the sampling circuit 250 samples the voltage Vpin on the shared pin 290 respectively in the intervals Q1~Q6 to obtain the sampling values V1~V6. The signal processing circuit 270 calculates the difference D1 between the sampling values V1 and V2, the difference D2 between the sampling values V3 and V4, and the difference D3 between the sampling values V5 and V6. In other embodiments, the sampling values V1, V3, and V5 may be respectively compared with one or more predetermined reference values for generating the differences D1, D2, and D3. The sampling values previously sampled by the sampling circuit 250 may also be utilized as the reference value.

Because the difference between the differences D1 and D2 is not less than a predetermined value (e.g., the differences D1 and D2 are not equal), the signal processing circuit 270 does not configures the operation parameter(s) according to the differences D1 and/or D2. When the difference between the differences D2 and D3 is less than the predetermined value (e.g., the differences D2 and D3 are equal), the signal processing circuit 270 configures the operation parameter(s) of the power convert 100 according to at least one the sampling value, the difference D2, the difference D3, and the computation value(s) calculated according to at least one of the sampling values, the difference D2, and the difference D3.

After the control circuit 180 configures the operation parameter(s) of the power converter 100, the control circuit 180 intermittently conducts the switch 150 in the period T2 to generate the required DC output signal Vout of the power converter 100. Moreover, the signal processing circuit 270 receives the DC output signal Vout of the power converter 100 through the feedback path of the resistors 170, 171, and 172 for configuring the driving circuit 210 to adjust at least one of the conduction time and the conduction frequency of the switch 150. Thus, the power converter 100 may generate the required output voltage and/or the required output current.

In the above embodiment, the sampling circuit 250 may be realized with analog circuits and/or digital circuits for sampling analog and/or digital sampling values. For example, the sampling circuit 250 may be realized with an analog sample-and-hold circuit, a sigma delta analog to digital converting circuit (ADC), a successive approximation ADC, and/or a flash type ADC.

Figure 5:
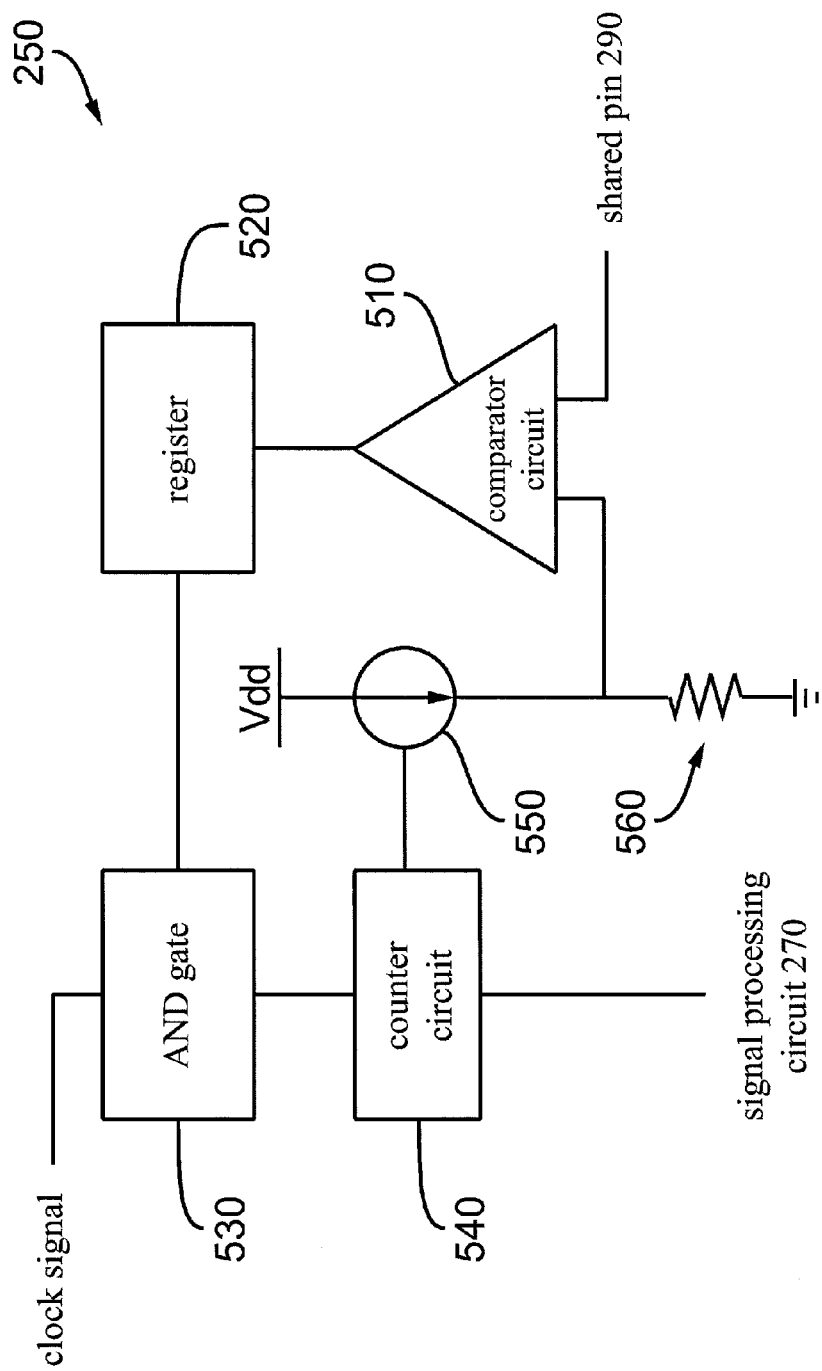
FIG. 5 shows a simplified functional block diagram of an example sampling circuit in FIG. 2.

FIG. 5 shows a simplified functional block diagram of an example sampling circuit 250 in FIG. 2. The sampling circuit 250 comprises a comparator circuit 510, a register 520, an AND gate 530, a counter circuit 540, a current source circuit 550, and a resistor 560.

In this embodiment, before the sampling circuit 250 samples the voltage Vpin on the shared pin 290, the signal processing circuit 270 resets the sampling circuit 250 to configure the content of the register 520 and the content of the counter circuit 540 to be default values (e.g., 0). The current source circuit 550 provides a current corresponding to the output of the counter circuit 540. The current provided by the current source circuit 550 flows through the resistor 560 to generate a corresponding voltage at the input end of the comparator circuit 510.

The comparator circuit 510 compares the voltage of the resistor 560 with the voltage Vpin on the shared pin 290. When the voltage on the resistor 560 and the voltage Vpin on the shared pin 290 are not equal, the comparator circuit 510 generates a non-zero value to be stored in the register 520.

The AND gate 530 performs an AND operation on a clock signal and the value stored in the register 520, and the output of the AND gate 530 is transmitted to the counter circuit 540. The counter circuit 540 accumulates the output of the AND gate 530 for configuring the output current of the current source circuit 550 and therefore configuring the voltage on the resistor 560.

In this embodiment, when the voltage on resistor 560 and the voltage Vpin on the shared pin 290 are not equal, the output of comparator circuit 510 is not zero so that the output of the register 520 is not zero. The counter circuit 540 accumulates the output of the AND gate 530 for configuring the output current of the current source circuit 550. When the voltage on the resistor 560 and the voltage Vpin on the shared pin 290 are equal, the output of the comparator circuit 510 is zero so that the output of register 520 is zero. The output of the counter circuit 540 maintains the same so that the output current of the current source circuit 550 and the voltage on the resistor 560 maintain the same. In one embodiment, the output of the counter circuit 540 may also be used as the digital representation of the voltage Vpin on the shared pin 290, and the signal processing circuit 270 may perform further calculation accordingly.

FIG. 5 shows one of the possible embodiments for realizing the sampling circuit 250. The sampling circuit 250 may be also configured according to different design considerations. For example, in FIG. 5, the resistor 560 may be configured in the interior and/or the exterior of the control circuit 180. The AND gate 530 and the counter 540 may be realized with a processor, a micro controller, digital circuits, analog circuits, etc.

Figure 6:
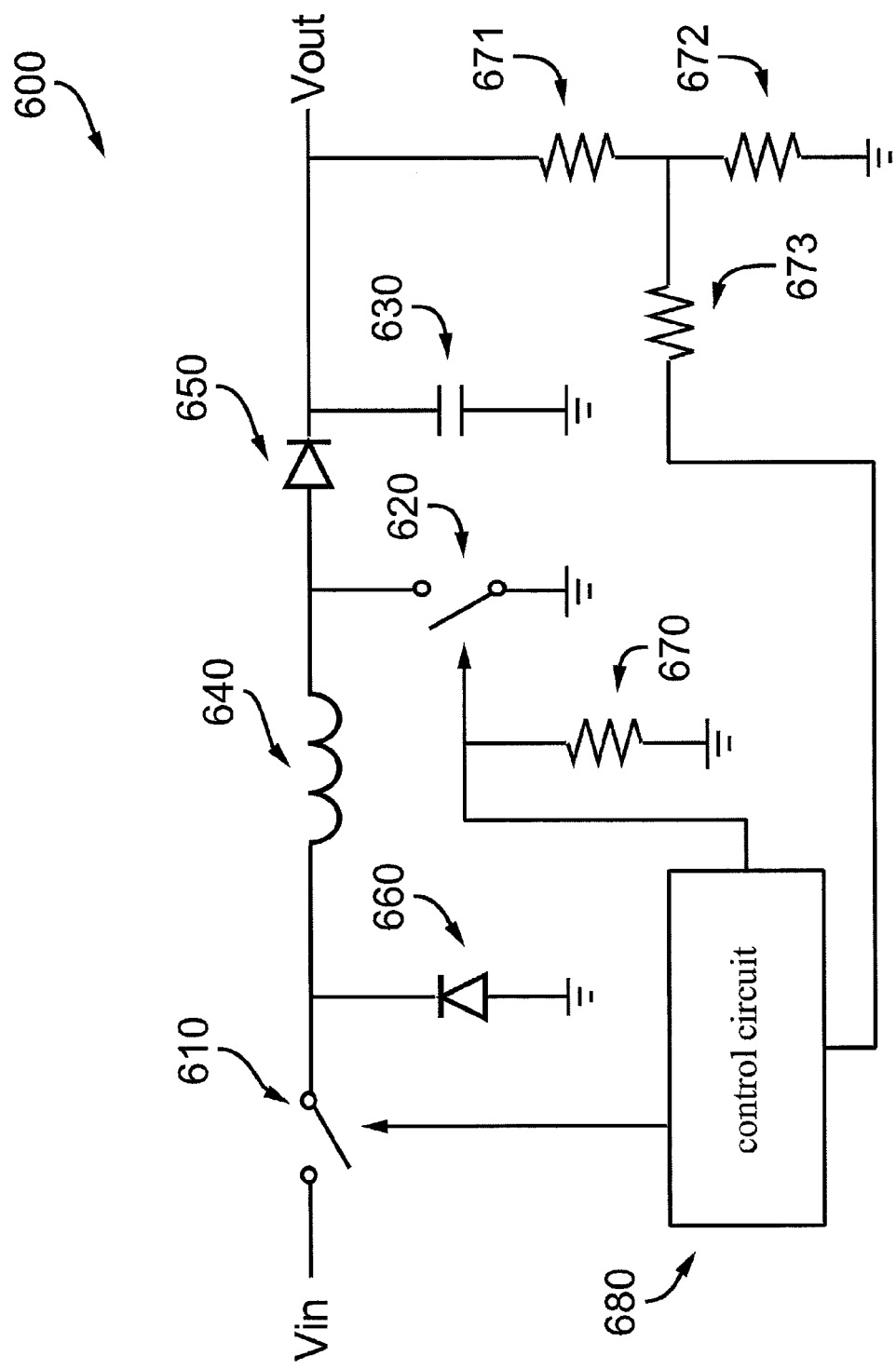
FIG. 6 shows a simplified functional block diagram of an example DC-DC converter.

In the above embodiments, the power converter 100 is configured as a boost type power converter. In other embodiments, the power converter 100 may also be utilized as a buck type power converter or a buck-boost power converter. Moreover, the above embodiments may also be utilized in the DC to DC power converter. For example, FIG. 6 shows a simplified functional block diagram of an example DC to DC power converter 600. The power converter 600 is a boost type power converter, comprising switches 610 and 620, a capacitor 630, an inductor 640, diodes 650 and 660, resistors 670, 671, 672, and 673, and a control circuit 680. Some components and connections are simplified or omitted in FIG. 6 for the purpose of conciseness and clear explanation.

The control circuit 680 configures the conduction statuses of the switches 610 and 620 so that the output voltage Vout of the power converter 600 may be configured to be greater than or equal to the input voltage Vin. The control circuit 680 may respectively configure the conduction times and/or the conduction frequencies of the switches 610 and 620 according to the DC output signals Vout received through the feedback path of the resistors 671, 672, and 673. Moreover, the control circuit 680 may be realized to be the same as or similar to the control circuit 180 so as to configures the operation parameter(s) of the power converter 600 according to the resistances of the resistors 671, 672, and 673. For example, the control circuit 680 may configure the overcurrent protection value of the power converter 600 according to the resistances of the resistors 671, 672, and 673.

In the timing diagram in FIGS. 3 and 4, the waveform of the voltage Vpin on the shared pin 290 are illustrated in an exaggerated manner for clearly explain that the above embodiments may operate normally when there are noises on the shared pin 290.

In other embodiments, the current source circuit 230 may provide only one current value in the period T1. The sampling circuit 250 samples the voltage Vpin on the shared pin 290 for multiple times and the signal processing circuits 270 configure the driving circuit 210 according to the sampling values.

In other embodiments, the resistors 170, 171, 172, 670, 671, 672, and 673 may be realized with one or more impedance elements and/or one or more active circuit components.

In other embodiments, the signal processing circuit 270 may be configured to compare two or more inconsecutive sampling values. When the difference(s) between the compared sampling values are less than a predetermined value (e.g., the compared sampling values are equal), the signal processing value 270 configures the operation parameter(s) according to the sampling value(s).

In other embodiments, the signal processing circuit 270 may also adopt other comparing algorithms to ensure the correctness of the sampling values of the sampling circuit. For example, the signal processing circuit 270 receives the sampling values transmitted from the sampling circuit 250 and configures the operation parameter(s) according to the sampling value sampled for the most times in a predetermined time period.

In other embodiments, the signal processing circuit 270 may configure the sampling time of the sampling circuit 250 according to the property of the AC power source Vac. For example, in one embodiment, the frequency of the AC signal is 60 Hz. When the AC signal flows through the bridge rectifier 110 and other components in the power converter 100, the voltage Vpin on the shared pin 290 is more stable in a period of $1/(2*60)$ seconds. Accordingly, the signal processing circuit 270 may configure the sampling frequency of the sampling circuit 250 to prevent sampling the voltage Vpin in the unstable period. For example, the sampling frequency of the sampling circuit 250 is configured to be multiples of 60 Hz so as to sample multiple times in a period of $1/(2*60)$ seconds. In other embodiments, the sampling frequency of the sampling circuit 250 may be configured to be greater, equal to, or less than the frequency of the AC power source Vac. Moreover, the sampling circuit 250 may adopt other techniques to accurately sample the voltage Vpin.

In other embodiments, the signal processing circuit 270 may be configured to be not directly coupled with the shared pin 290, and the signal processing circuit 270 configures the driving circuit 210 according to the DC output signal Vout sampled by the sampling circuit 250.

The above embodiments may be utilized in the boost type, the buck type, and the buck-boost type AC-DC power converter, DC-DC power converter, and other types of the power converter with suitable modification. Therefore, the driving circuit and other circuit block may share the same pin on the integrated circuit package. When the required pin number of the integrated circuit package is reduced, a smaller package size may be chosen to receive the integrated circuit of the control circuit and/or other circuit components. The dimensions of the integrated circuit package and the electronic devices may be effectively reduced, and the environmental protection purpose may be better achieved.

In the above embodiment, the control circuit samples and compares the sampling values for multiple times. The control circuit may still obtain the correct sampling value to configure the operation parameter(s) of the power converter even when there are noises on the shared pin. After the control circuit configures the operation parameter(s) according to the correct sampling value(s) and the power converter may operate in the correct operation mode, the control circuit starts to conduct the switch so as to ensure the functionality of the power converter.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to . . . ." Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a power converter, comprising:
   a shared pin, for coupling with an output end of a power converter through a resistor;
   a driving circuit, for coupling with a switch of the power converter to configure a conduction status of the switch;
   a current source circuit, coupled with the shared pin, for providing a current to the resistor through the shared pin in a first period;
   a sampling circuit, coupled with the shared pin, for sampling a signal on the shared pin in a first interval and a second interval of the first period to respectively generate a first sampling value and a second sampling value; and
   a signal processing circuit, coupled with the shared pin of the sampling circuit, for comparing the first sampling value with a first reference value, comparing the second sampling value with a second reference value, calculating a first difference between the first sampling value and the first reference value, and calculating a second difference between the second sampling value and the second reference value;
   wherein in response to a detection by the signal processing circuit that a difference between the first difference and the second difference is less than a predetermined value, the signal processing circuit receives an output signal on the output end through the shared pin, and configures at least one of a conduction time and a conduction frequency of the switch through the driving circuit according to at least one of the output signal and a computation value calculated according to the output signal.

2. The control circuit of claim 1, wherein the signal processing circuit configures one or more operating parameters of the power converter according to at least one of the first sampling value, the second sampling value, a first computation value calculated according to the first sampling value, and the second computation value according to the second sampling value.

3. The control circuit of claim 2, wherein the sampling circuit samples the shared pin in a third interval and in a fourth interval to respectively generate the first sampling value and the second sampling value.

4. The control circuit of claim 1, wherein the current source circuit configures the current to vary between a first current value and a second current value repetitively in the first period.

5. The control circuit of claim 4, wherein the sampling circuit samples the shared pin in a third interval and in a fourth interval to respectively generate the first sampling value and the second sampling value.

6. The control circuit of claim 1, wherein the driving circuit is used for coupling with a control terminal of the switch to configure the conduction status of the switch.

7. A control method for a power converter, comprising:
   coupling a shared pin with an output end of a power converter through a resistor;
   providing a current to the resistor through the shared pin in a first period;
   sampling a signal on the shared pin in a first interval and a second interval of the first period to respectively generate a first sampling value and a second sampling value;
   comparing the first sampling value with a first reference value and calculating a first difference between the first sampling value and the first reference value;
   comparing the second sampling value with a second reference value and calculating a second difference between the second sampling value and the second reference value; and
   in response to a detection that a third difference between the first difference and the second difference is less than a predetermined value, receiving an output signal on the output end of the power converter through the shared pin in a second period, and accordingly configuring at least one of a conduction time and a conduction frequency of a switch of the power converter according to at least one of the output signal and a computation value calculated according to the output signal.

8. The control method of claim 7, further comprising:
   configuring the current to vary between a first current value and a second current value in the first period; and
   configuring one or more operation parameters of the power converter according to at least one of the sampling values, differences between the sampling values, computation values calculated according to the sampling values, and computation values calculated according to the differences.

9. The control method of claim 8, further comprising:
   sampling on the shared pin in a third interval and in a fourth interval to respectively generate the first sampling value and the second sampling value.

* * * * *